Sept. 10, 1957  H. S. JOPSON  2,805,685
RESTRICTION DEVICE
Filed March 1, 1955
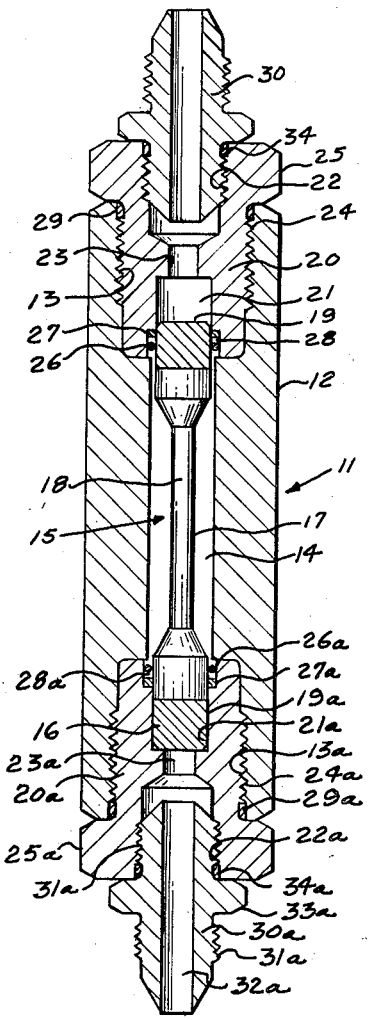
INVENTOR.
HUBERT S. JOPSON
BY Lloyd B. Stevens, Jr.
Wade Koontz and
ATTORNEYS

United States Patent Office 2,805,685
Patented Sept. 10, 1957

2,805,685
RESTRICTION DEVICE

Hubert S. Jopson, Garden Grove, Calif., assignor to the United States of America as represented by the Secretary of the Air Force Application March 1, 1955, Serial No. 491,553

4 Claims. (Cl. 138—42)

This invention relates to easily-replaceable sintered metal inserts usable in pipes and vessels for producing a large pressure drop of any desired magnitude therein and to an improved device containing the insert.

In the past an orifice has been used to attain large pressure drops, but a number of difficulties are encountered with the use of an orifice. The single small hole is difficult to make and reproduce accurately. Due to the high flow involved, erosion would in time change the size of the hole. The single small hole is vulnerable to becoming plugged with foreign matter.

Another previously used method of producing a large pressure drop is a capillary tube. Unless an exceedingly long length of tube is used, however, the hole size becomes quite small with the attendant danger of its becoming plugged with foreign matter. In many cases the long length of tubing presents quite a problem in incorporating it in a small rugged unit. Also the tubing is subject to damage during assembly and use unless suitably protected. The weight of the complete capillary unit would be greater than the sintered metal type of unit.

Sintered metal type restriction devices represent an improvement over both orifices and capillary tubes for providing large pressure drops. The pores on the surface of a sintered metal restriction device are numerous and they are cross connected internally, so the plugging of a few pores on the surface does not adversely affect the operation of the restriction device. Examples of a conventional sintered metal filter and a sintered metal restriction device are described in U. S. 2,576,610.

It is an object of this invention to provide an improved sintered metal restriction device suitable for producing large pressure drops.

It is another object of this invention to provide easily replaceable sintered metal restriction inserts which are difficult to plug, are usable in pipes and vessels, and have necked down central portions of cross sections designed to give any desired pressure drop to suit the particular installation and use.

It is an additional object of the invention to provide an improved restriction device for producing a high pressure drop wherein sintered metal inserts having thin-walled impervious outer partial covers and necked down central portions are usable.

Further objects and advantages of the present invention will be apparent from the following description and reference to the accompanying drawings wherein a preferred embodiment of the present invention is clearly shown.

The invention is directed to an improved restriction device and to replaceable sintered metal inserts usable therein which inserts for a particular installation are of a fixed length. For a particular installation any desired pressure drop may be obtained by using an insert having a necked-down portion of proper cross sectional area. These devices are usable in pipes and vessels.

In a sintered metal insert designed with a necked-down portion provision must be made for covering at least the necked-down portion of the insert to prevent bypassing this portion of the insert. It is desirable to have the covering on the insert as thin-walled as possible to avoid bulkiness in the restriction device. However, thin-walled coverings on the necked-down portion tend to rupture outwardly due to the high internal pressure in the insert unless some method is devised to compensate this pressure on the outside of the covering.

The pressure compensation outside the covering of the insert is accomplished in a very unique manner whereby a specially designed insert is used in a fitting or fittings which cooperates with the insert to give the pressure compensation yet the necessary pressure sealing. The core of the insert is a sintered metal core having a necked-down central portion. It is normally longer than it is wide or deep to give a large pressure drop. This core can be of most any cross sectional shape, i. e., square, rectangular, elliptical, circular, etc., but it is preferred to use an insert of circular cross section. The cross sectional area of the necked-down portion is designed to give the desired pressure drop, a series of the inserts being made with necked-down portions of varying cross sectional area to provide a wide range of pressure drops. The outer surface of the necked-down portion and part of the surface adjacent the necked-down portion is provided with a cover which is for all practical purposes impervious to the fluid, gas and/or liquid, flowing through the restriction device. The surface on and near the ends of the core is not covered.

The core of this invention can be formed from non-compacted metal powders, such as are described in U. S. 2,157,596 and U. S. 2,273,589. These powders when sintered in a noncompacted condition present a highly porous material, the porosity of which may be readily controlled by the grain size of the powders utilized. The grain size and the length of the sintered metal core together with its cross section determine the pressure drop. Metal powders are available in any number of different grain sizes, for example from about 80 to 300 mesh, and the core can be satisfactorily made from any of these metal powders. The passages through the core are of capillary size. In the case of my inserts the core can be prepared within its cover or a cover can be plated on the finished core by conventional means. In the former method a suitable mold would be used to hold the powder and cover during the heating step in the sintering furnace. As an example, bronze powder having a preferred size of from 80 to 150 mesh is heated at temperatures of from about 1500 to 1600° F. for a period of about one-half hour under nonoxidizing conditions whereupon the metal powders sinter together to form a homogeneous core bonded to the walls of the cover.

Other metal powders in addition to bronze can be used in the core, e. g., copper coated iron, copper-nickel alloy, copper-zinc alloy or the like. Suitable temperatures, time of treatment, and treatment conditions are used depending on the composition of the metal powder being processed.

The inserts are mounted in a suitable fitting or fittings to form a device usable in pipes and vessels. The body portion of the device has a channel shaped to receive the insert. The body portion can have "O-rings" with back-up gaskets positioned near either end of the channel containing the insert, or one or both "O-rings" may be contained in fittings for the ends of the body portion. Other types of seals can be used but "O-ring" seals are preferred. The body portion of the restriction device can be composed of a unitary piece of metal or other suitable material. Alternately the body portion can be composed of two separate sections of about equal size which may be rigidly attached at the center to form a tight seal and in substance a single body piece, but the parts of this body section must be separable to change inserts if no other provision is made for this by fittings at one or both ends of the body. It is preferred that the body portion be unitary in construction with fittings in one or both ends to allow removal and replacement of the inserts.

The channel in the body portion and end-fittings, if used, is of proper length and the "O-rings" so positioned that the insert is moved to the low pressure end of the channel when the device is put in service. If for any reason pressure is vented from the high pressure end of the device, the former low pressure end becomes the high pressure end relatively, and the insert moves to the opposite end of the channel, which would now be the low pressure end.

In this device the parts are so designed that the "O-ring" at the high pressure end bears upon an uncovered portion of the core of the insert. Such an arrangement allows this "O-ring" to be by-passed by the pressure via a short path through the pores of the core. Thereby, except for the slight pressure drop around the "O-ring" the full pressure applied at the high pressure end of the device is applied on the outside surface of the insert cover.

The "O-ring" on the low pressure side bears upon the cover of the insert to form a seal so the fluid flowing through the device is prevented from bypassing the central portion of the sintered metal core of the insert.

A preferred embodiment of my invention is shown in the drawing which is a sectional view of my restriction device.

The drawing shows restriction device 11. This device has cylindrical body portion 12 which may be made of aluminum or other suitable material which has threaded apertures 13 and 13a in the upper and lower ends, respectively, and cylindrical channel 14 connecting these apertures. Cylindrical insert 15 having a sintered metal core 16, a necked-down central portion 18, and a cover 17 which may be bronze or other suitable material are shown positioned in channel 14. Cover 17 which is for practical purposes impervious to the flow of fluids in the device covers the necked-down central portion of the core and a portion of the enlarged portions of the core adjacent the necked-down portion. End portions 19 and 19a of core 16 are not covered. Insert 15 is longer than channel 14 and the ends of the insert extend into apertures 13 and 13a.

Threaded flanged fittings 20 and 20a which may be made of aluminum or other suitable material are positioned in apertures 13 and 13a, respectively. Gaskets 29 and 29a made of a suitable gasket material such as rubber provide a tight seal for these fittings. Fittings 20 and 20a have threaded portions 24 and 24a which mate with the threads of apertures 13 and 13a. Cylindrical apertures 21 and 21a are positioned in the ends of fittings 20 and 20a adjacent threaded portions 24 and 24a, respectively, threaded apertures 22 and 22a are positioned in the other ends of the fittings, and cylindrical channels 23 and 23a connect these apertures. These fittings also have flanges 25 and 25a. "O-ring" 26 and 26a and back-up gaskets 27 and 27a which may be made of leather or other suitable materials are positioned in enlargements 28 and 28a of apertures 21 and 21a, respectively.

Fittings 30 and 30a which may be made of aluminum or other suitable material can be used to connect the restriction device into a pipe or vessel. These fittings are identical in shape and size and only fitting 30a will be described in detail. Fitting 30a has identical threaded portions 31a on each end with flange 33a positioned between. Cylindrical channel 32a runs axially from end to end in the fitting. Fitting 30a may be positioned in fitting 20a by screwing threaded portion 31a into threaded aperture 22a. Gasket 34a which may be made of rubber or other suitable material is used to give a tight seal between these fittings.

Assuming that the device is installed in a pipe and pressure is applied at the upper end of the device, insert 15 is moved by the pressure bearing on it toward the low pressure or lower end of the device and is positioned as shown in the drawing. Fluid flows through the uncovered part 19 of the core 16, around back-up gasket 27 and "O-ring" 26 into channel 14 on the outside of cover 17. The fluid which may be a liquid or gas or mixture of the two, is prevented from bypassing the covered portion of the core of the insert by "O-ring" 26a and back-up gasket 27a which provide a seal as shown.

If for any reason pressure is lost on the high pressure or upper end of the device, the former low pressure end or lower end would become the high pressure end and insert 15 would be moved to the upper end of aperture 21. In this position the insert would operate as it did before except the direction of flow in the device would be reversed.

While the embodiment of the present invention as herein disclosed, constitutes the preferred form, it is to be understood that other forms might be adopted, all coming within the scope of the claims which follow.

I claim:

1. An easily-replaceable restriction insert usable in pipes and vessels comprising a sintered metal core having a necked-down central portion, and an impervious cover on the entire outside surface of the necked-down central portion of said core and on portions of said core immediately adjacent the necked-down central portion.

2. An easily-replaceable restriction insert usable in pipe and vessels comprising a cylindrical sintered metal core having a necked-down central portion, and an impervious cover on the entire outside surface of the necked-down central portion of said core and on portions of said core immediately adjacent the necked-down central portion.

3. A restriction device comprising a body portion having a passage therethrough; a removable insert positioned in and movable longitudinally in said passage comprising a sintered metal core having a necked-down central portion, and an impervious cover on the entire outside surface of the necked-down central portion of said core and on portions of said core immediately adjacent the necked-down central portion; means for permitting the removal of said insert from said body portion, said means also serving to prevent ejection of said insert from said passage upon application of pressure, seals positioned in the passage of said body portion near each end of the passage, and said seals so positioned in the passage that when said insert is at one end of the passage the seal near this end of the passage is sealingly engaged with a covered portion of said insert and the seal near the other end of the passage cooperates with an uncovered portion of said insert.

4. A restriction device comprising a cylindrical body portion having a threaded aperture in each end thereof and a cylindrical passage connecting said apertures; and a removable insert positioned and movable longitudinally in said pasage comprising a cylindrical sintered metal core having a necked-down central portion, and an impervious cover on the entire outer surface of the necked-down central portion of said core and on portions of said core immediately adjacent the necked-down central portion; a threaded flanged fitting positioned in each aperture of said body portion, a cylindrical aperture in the end of said fitting adjacent the threaded portion, an "O-ring" and back-up gasket positioned near the outer end of the cylindrical fitting aperture in an enlargement of the aperture, a threaded aperture in the other end of said fitting, and a channel connecting the apertures of said fitting, the diameter of said channel being less than the diameter of said insert; and said "O-rings" and back-up gaskets so positioned in said fittings that when said insert is at the inner end of the cylindrical aperture of one fitting the "O-ring" and back-up gasket of this fitting is sealingly engaged with a covered portion of said insert and the "O-ring" and back-up gasket of the other fitting cooperates with an uncovered portion of said insert.

References Cited in the file of this patent

UNITED STATES PATENTS 2,228,406    Schmidt _____ Jan. 14, 1941